US011033088B2

(12) United States Patent
Atkinson et al.

(10) Patent No.: US 11,033,088 B2
(45) Date of Patent: Jun. 15, 2021

(54) HAIRCARE APPLIANCE

(71) Applicant: Dyson Technology Limited, Wiltshire (GB)

(72) Inventors: Antoine Francois Atkinson, Swindon (GB); Adam David Lambert, Swindon (GB)

(73) Assignee: Dyson Technology Limited, Malmesbury (GB)

( * ) Notice: Subject to any disclaimer, the term of this patent is extended or adjusted under 35 U.S.C. 154(b) by 113 days.

(21) Appl. No.: 16/164,083

(22) Filed: Oct. 18, 2018

(65) Prior Publication Data
US 2019/0116955 A1 Apr. 25, 2019

(30) Foreign Application Priority Data

Oct. 19, 2017 (GB) ...................................... 1717176

(51) Int. Cl.
*A45D 20/12* (2006.01)
*B01D 46/00* (2006.01)
*B01D 46/24* (2006.01)

(52) U.S. Cl.
CPC ......... *A45D 20/12* (2013.01); *B01D 46/0005* (2013.01); *B01D 46/24* (2013.01)

(58) Field of Classification Search
None
See application file for complete search history.

(56) References Cited

U.S. PATENT DOCUMENTS

| | | |
|---|---|---|
| 3,265,075 A | 8/1966 | Edman et al. |
| 3,953,710 A | 4/1976 | Dyer |
| 4,254,324 A | 3/1981 | Vrtaric |
| 5,325,809 A | 7/1994 | Mulle, Jr. |
| 5,490,336 A | 2/1996 | Smick et al. |
| 6,798,982 B2 | 9/2004 | Ryu et al. |
| 7,038,171 B2 | 5/2006 | Osada et al. |
| 8,028,437 B2 | 10/2011 | Brown-Carter |
| 8,256,132 B2 | 9/2012 | Gaillard et al. |

(Continued)

FOREIGN PATENT DOCUMENTS

| | | |
|---|---|---|
| AU | 2017208192 | 8/2017 |
| CN | 201341553 | 11/2009 |

(Continued)

OTHER PUBLICATIONS

Translation of JPS5883905, accessed May 14, 2020 (Year: 1983).*

(Continued)

*Primary Examiner* — Christopher P Jones
*Assistant Examiner* — Phillip Y Shao
(74) *Attorney, Agent, or Firm* — Morrison & Foerster LLP

(57) ABSTRACT

A hair care appliance comprising a cylindrical housing having a first end and a second end and a fluid inlet which is cylindrical and is adjacent the first end of the housing, a fluid outlet, a fluid flow path extending between the fluid inlet and the fluid outlet and a cable for supplying power to the appliance wherein the cable connects to the housing at the first end of the housing, wherein the fluid inlet is provided with a filtering system comprising a removable portion wherein the removable portion comprises a filter grille having first and second states and the filter grille is retained in a first state by a magnetic coupling between two portions of the filter grille.

25 Claims, 8 Drawing Sheets

(56) References Cited

U.S. PATENT DOCUMENTS

| | | |
|---|---|---|
| 8,601,713 B2 | 12/2013 | Gaillard et al. |
| 8,857,447 B2 | 10/2014 | Heller |
| 9,282,799 B2 | 3/2016 | Courtney et al. |
| 9,526,310 B2 | 12/2016 | Courtney et al. |
| 10,010,150 B2 | 7/2018 | Courtney et al. |
| D830,630 S | 10/2018 | Chia et al. |
| D848,675 S | 5/2019 | Chia et al. |
| 10,278,471 B2 | 5/2019 | Shelton et al. |
| D854,745 S | 7/2019 | Chia et al. |
| D856,579 S | 8/2019 | Chia et al. |
| D856,580 S | 8/2019 | Chia et al. |
| 10,575,617 B2 | 3/2020 | Courtney et al. |
| 2009/0188126 A1 | 7/2009 | Gaillard et al. |
| 2014/0208605 A1 | 7/2014 | Yoshidome |
| 2014/0261522 A1* | 9/2014 | Smith ............ A45D 1/04 132/211 |
| 2014/0290087 A1 | 10/2014 | Weatherly |
| 2015/0089828 A1 | 4/2015 | Moloney et al. |
| 2016/0166033 A1 | 6/2016 | Kerr et al. |
| 2016/0235178 A1 | 8/2016 | Atkinson et al. |
| 2016/0338466 A1 | 11/2016 | Atkinson et al. |
| 2016/0367003 A1 | 12/2016 | Stephens et al. |
| 2018/0255896 A1 | 9/2018 | Chia et al. |

FOREIGN PATENT DOCUMENTS

| | | |
|---|---|---|
| CN | 202146022 U | 2/2012 |
| CN | 202407584 | 9/2012 |
| CN | 103393272 | 11/2013 |
| CN | 104244766 A | 12/2014 |
| CN | 204742992 U | 11/2015 |
| CN | 106165960 A | 11/2016 |
| CN | 106256287 A | 12/2016 |
| DE | 8715086 | 9/1988 |
| DE | 3906256 | 8/1990 |
| EP | 2086367 | 8/2010 |
| GB | 2399751 | 9/2004 |
| GB | 2487996 A | 8/2012 |
| GB | 2497192 | 6/2013 |
| GB | 2518641 A | 4/2015 |
| GB | 2538561 A | 11/2016 |
| GB | 2539437 A | 12/2016 |
| GB | 2560356 A | 9/2018 |
| GB | 2567661 A | 4/2019 |
| JP | 58-83905 | 5/1983 |
| JP | 58-154706 | 10/1983 |
| JP | 58-180107 | 10/1983 |
| JP | S58-180105 A | 10/1983 |
| JP | 60-21205 | 2/1985 |
| JP | 60-215305 | 10/1985 |
| JP | 62-189005 | 12/1987 |
| JP | 1-75437 | 5/1989 |
| JP | 1-121502 | 8/1989 |
| JP | 2002-238649 A | 8/2002 |
| JP | 2009-191990 A | 8/2009 |
| JP | 2010-187454 A | 8/2010 |
| JP | 2014-139396 A | 7/2014 |
| JP | 2018-149286 A | 9/2018 |
| JP | 2019-76720 A | 5/2019 |
| WO | 2006/001657 | 1/2006 |
| WO | 2018/162878 A1 | 9/2018 |
| WO | 2019/077301 A1 | 4/2019 |

OTHER PUBLICATIONS

International Search Report and Written Opinion dated Oct. 30, 2018, directed to International Application No. PCT/GB2018/052775; 11 pages.

Search Report dated Apr. 18, 2018, directed to GB Application No. 1717176.0; 1 page.

Chia et al., U.S. Office Action dated Mar. 9, 2020, directed to U.S. Appl. No. 15/914,413; 11 pages.

* cited by examiner

HAIRCARE APPLIANCE

REFERENCE TO RELATED APPLICATIONS

This application claims the priority of United Kingdom Application No. 1717176.0, filed Oct. 19, 2017, the entire contents of which are incorporated herein by reference.

FIELD OF THE INVENTION

This invention relates to a haircare appliance and in particular to a filter for a haircare appliance.

BACKGROUND OF THE INVENTION

In a conventional hot styling appliance, air is drawn into an inlet by a fan unit and directed towards the hair by an outlet. Often, one appliance is provided with different attachments, each having a different outlet and thus a different function, for example drying, curling or volumising. Depending on the style desired, the air may or may not be heated. The attachment may include bristles onto which hair is wrapped and held for styling. Conventionally a filter is provided to filter fluid that enters the appliance to remove dust and hair.

Traditionally, hairdryers have a casing and a handle where the casing houses components such as the filter, fan unit and heater. Hair styling appliances in contrast are held by the casing.

It is known to provide multi layered filtering systems for example with a grille having relatively large apertures and an inner filter having relatively small apertures. Often the grille is removable to enable cleaning of the inner filter, or even replacement of one of the layers of the filter in the event of damage. The grille can be friction fitted, twisted onto, mechanically attached or snapped onto a casing of the appliance.

Often, the appliance comprises a cable for supplying power in the vicinity of the fluid inlet and filter of the appliance. If the filter is removed for cleaning, it will still be retained on the cable and it is preferred to remove it from the cable. The present invention seeks to provide a filter which can be completely removed from the appliance for washing and replaced without compromising filtration.

SUMMARY OF THE INVENTION

In a first aspect, the invention provides a hair care appliance comprising a cylindrical housing having a first end and a second end and a fluid inlet which is cylindrical and is adjacent the first end of the housing, a fluid outlet, a fluid flow path extending between the fluid inlet and the fluid outlet and a cable for supplying power to the appliance wherein the cable connects to the housing at the first end of the housing, wherein the fluid inlet is provided with a filtering system comprising a removable portion wherein the removable portion comprises a filter grille having first and second states and the filter grille is retained in a first state by a magnetic coupling between two portions of the filter grille.

The first state and the second state can also be considered to be two forms, one with the magnetic coupling united and the other with the magnetic coupling broken.

Preferably, the filtering system further comprises a fixed portion including a filter mesh and the filter mesh is retained with respect to the cylindrical housing when the filter grille is removed. This prevents the appliance from being activated without any filtration to the fluid entering the appliance.

In a preferred embodiment, the cylindrical housing extends along an axis between the first end and the second end.

Preferably, the filter grille is retained with respect to the cylindrical housing via one or more of a twist lock system and a magnetic coupling. Thus the filter grille may be rotated with respect to the housing to fix it to the housing or the filter grille may be displaced longitudinally with respect to the housing.

In a preferred embodiment, the cylindrical housing comprises an outer wall extending from the second end towards the first end and when attached to the cylindrical housing, the filter grille comprises a wall which extends from the first end of the cylindrical housing towards the second end.

Preferably, the wall of the filter grille abuts the outer wall.

In a preferred embodiment, the wall of the filter grille comprises a lip which extends either inside or outside the outer wall. This aids alignment between the outer wall and the wall.

Preferably, the filtering system comprises a third filtering layer.

In a preferred embodiment, the third filtering layer is a mesh and is secured to an inner surface of the filter grille.

Preferably, the filter grille is washable.

In a preferred embodiment, the magnetic coupling comprises either of two magnets or a magnet and a piece of magnetisable material.

Preferably, the two portions of the filter grille comprise a first edge and a second edge.

In a preferred embodiment, the filter grille comprises a wall and the wall extends between the first edge and the second edge.

Preferably, when the filter grille is in the first state, the first edge and the second edge abut.

Preferably, the first edge and the second edge are each provided with a recess for accommodating either a magnet or a piece of magnetisable material.

In a preferred embodiment, when the filter grille is attached to the housing, the magnetic coupling is adjacent the first end of the housing.

Preferably, the first edge and the second edge each comprise a part of a locating feature.

In a preferred embodiment, the locating feature is formed from a protrusion extending circumferentially from one of the first edge and the second edge and a cooperating recess in the other one of the first edge and second edge. This locking feature helps to centralise and circularise the filter grille.

Preferably, the filter mesh comprises a frame and filtering media bonded to the frame.

In a preferred embodiment, the frame comprises a locating slot extending along the frame parallel to an axis extending between the first end and the second end of the housing.

Preferably, the filter grille comprises a mechanical joint extending radially inwards from an inner surface of the wall of the filter grille and the mechanical joint is adapted to be retained within the locating slot.

In a preferred embodiment, the mechanical joint is formed from two parts, a first part of the mechanical joint is formed adjacent the first edge of the wall and a second part of the mechanical joint is formed adjacent the second edge of the wall.

Preferably, when the filter grille is in the second state, the first edge and the second edge of the wall are spaced apart.

In a preferred embodiment, the appliance is a hairdryer.

Preferably, the appliance is a hot styling brush.

BRIEF DESCRIPTION OF THE DRAWINGS

The invention will now be described, by way of example only, with reference to the accompanying drawings, in which.

DETAILED DESCRIPTION OF THE INVENTION

Figure 1:
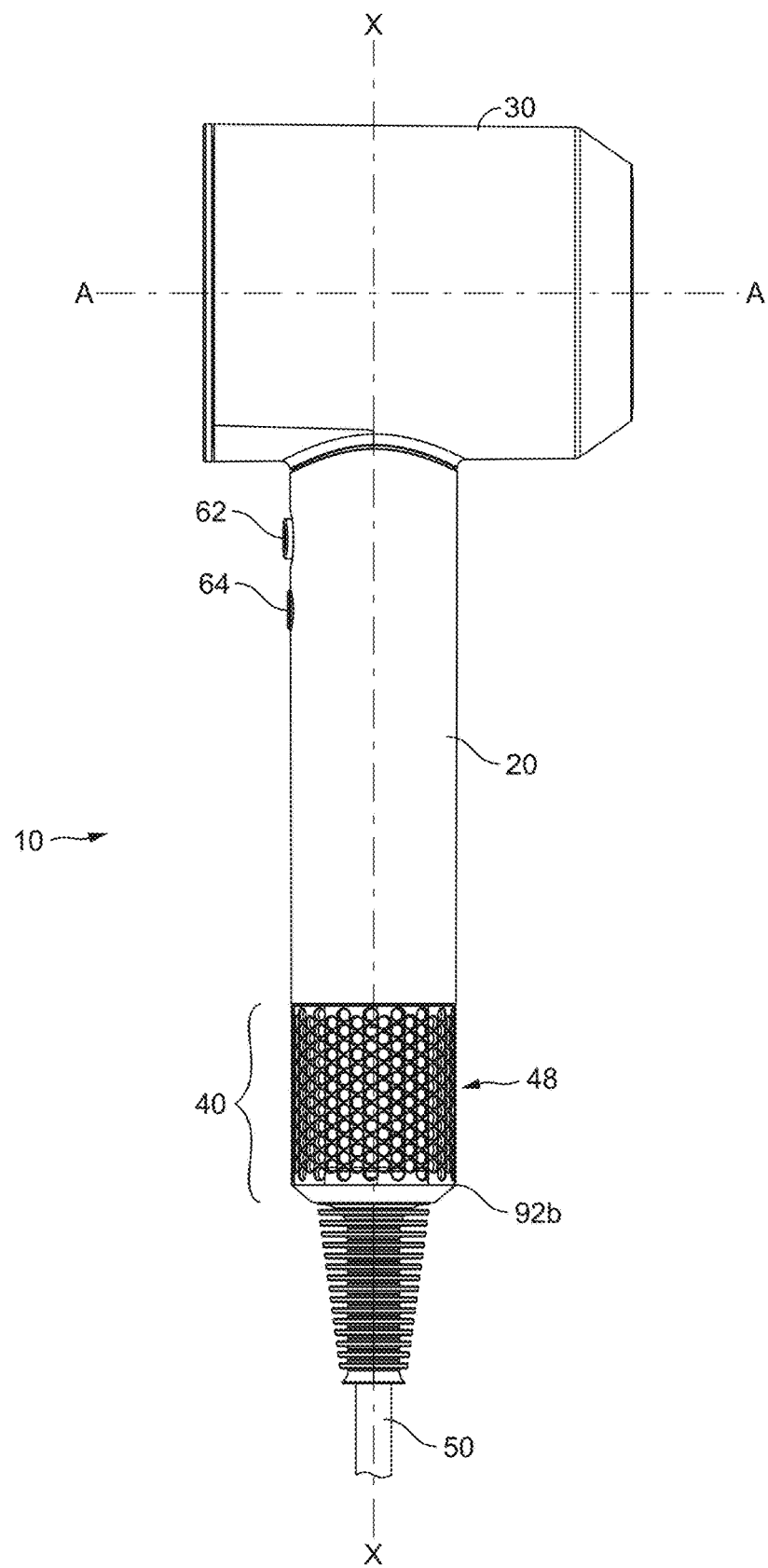
FIG. 1 shows a hairdryer having a removable filter.
Figure 2:
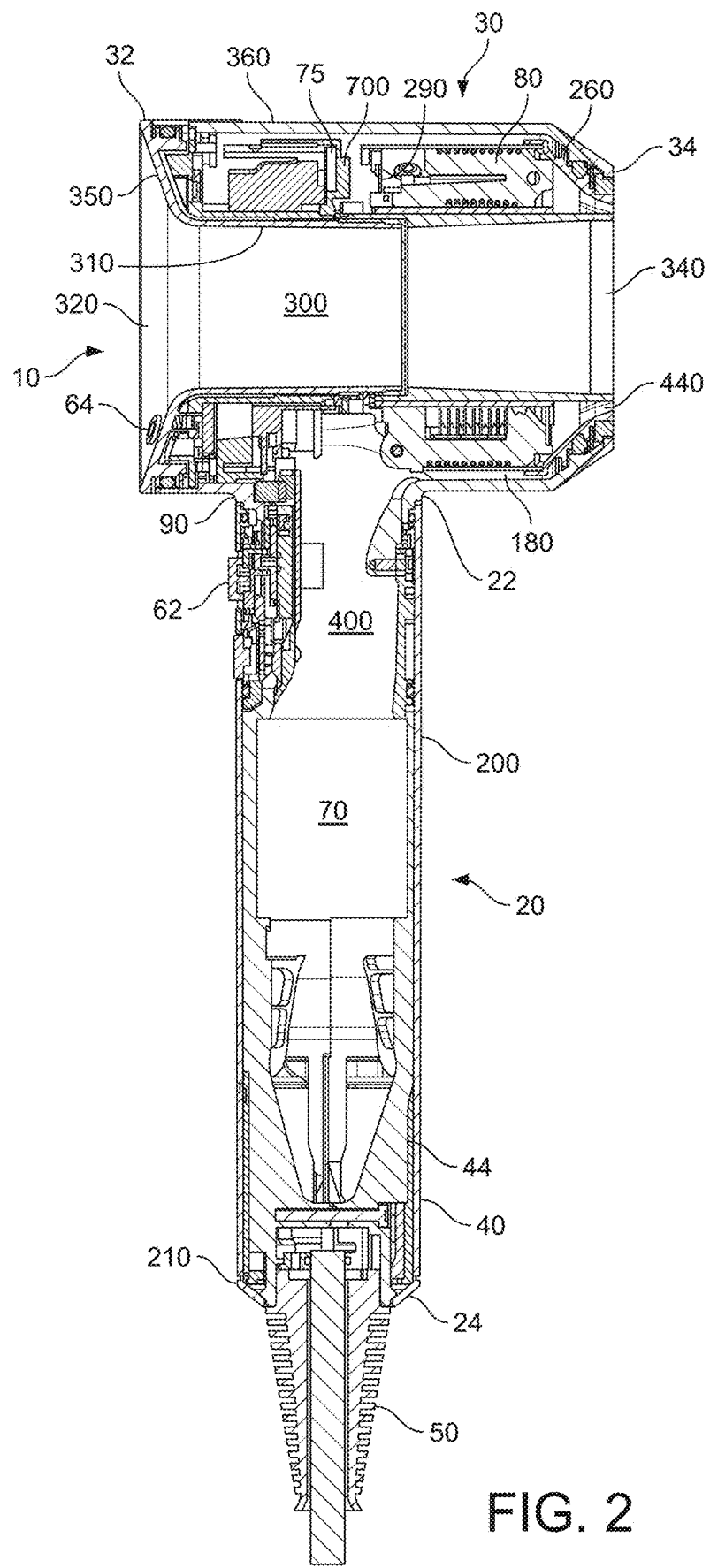
FIG. 2 shows a cross section through the hairdryer of FIG. 1.

FIGS. 1 and 2 show an example of hairdryer 10 with a handle 20 and a body 30. The handle has a first end 24 distal from the body 30 and which includes a primary fluid inlet 40 and a second end 22 which is connected to the body 30. Power is supplied to the hairdryer 10 via a cable 50. At a distal end of the cable 50 from the hairdryer 10 a plug (not shown) is provided, the plug may provide electrical connection to mains power or to a battery pack, for example. The primary fluid inlet 40 is provided with a filtering system which includes two or three layers of filtration. The filtering system includes a removable portion 52 and a fixed portion 54. The removable portion 52 can be removed by a user for cleaning and the fixed portion 54 can be accessed by a user for cleaning when the removable portion 52 has been removed.

Figure 3:
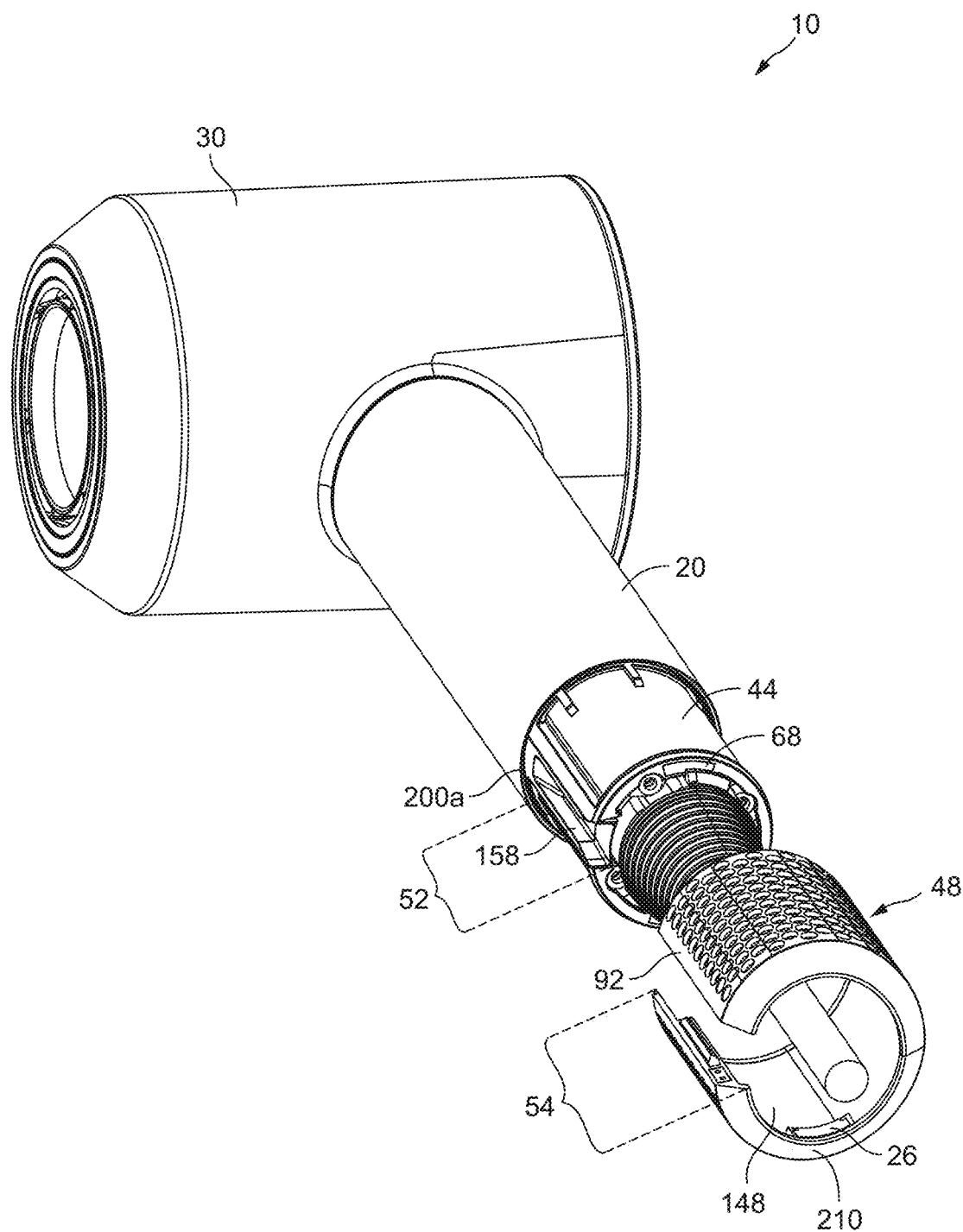
FIG. 3 shows an isometric view of the hairdryer with the filter grille removed.

The removable portion 52 includes an outer layer formed by a filter grille 48 and the fixed portion 54 includes an inner layer formed by a filter mesh 44. There is optionally a third layer 148 (FIG. 3) located between the outer layer and the inner layer in this embodiment, the third layer 148 forms part of the removable portion 52a of the filtering system. The filter mesh 44 is fixed with respect to the handle 20 and can be cleaned by wiping or brushing when the filter grille 48 is removed.

The handle 20 has an outer wall 200 which extends from the body 30 towards the first end 24 of the handle. The primary fluid inlet 40 in the handle 20 has an outer layer formed by the filter grille 48 which continues the profile of the outer wall 200 of the handle 20 from a distal end 200a of the outer wall 200 from the body 30 and extends to the first end 24 of the handle. The filter grille 48 includes a wall 92 having an array of apertures 42 that extend in a series of rows and/or columns and an end wall 210 which extends radially inwards from the wall 92. The cable 50 enters the hairdryer through an aperture 212 in the end wall 210. The cable 50 is located approximately in the middle of the end wall 210 so extends from the centre of the handle 20. The handle 20 has a longitudinal axis X-X along which the outer wall 200 extends from the body 30 towards the first end 24.

The filter grille 48 helps to prevent hair and other foreign objects from entering the primary fluid flow path 400 of the hairdryer and provides a coarse filtering stage; the apertures 42 have a diameter of around 2.8 mm (2800 microns).

Upstream of the primary fluid inlet 40, a fan unit 70 is provided. The fan unit 70 includes a fan and a motor. The fan unit 70 draws fluid through the primary fluid inlet 40 towards the body 30 through a primary fluid flow path 400 that extends from the primary fluid inlet 40 and into the body 30 where the handle 20 and the body 30 are joined 90. The body 30 has a first end 32 and a second end 34, the primary fluid flow path 400 continues through the body 30 towards the second end 34 of the body, around a heater 80 and to a primary fluid outlet 440 where fluid that is drawn in by the fan unit exits the primary fluid flow path 400. The primary fluid flow path 400 is non-linear and flows through the handle 20 in a first direction and through the body 30 in a second direction which is orthogonal to the first direction.

The body 30 includes an outer wall 360 and an inner duct 310. The primary fluid flow path 400 extends along the body from the junction 90 of the handle 20 and the body 30 between the outer wall 360 and the inner duct 310 towards the primary fluid outlet 440 at the second end 34 of the body 30.

An inner wall 260 extends within the outer wall 360. The inner wall 260 at least partially defines the primary fluid outlet 440 and extends from the second end 34 of the body 30 between the inner duct 310 and the outer wall 360.

Another fluid flow path is provided within the body; this flow is not directly processed by the fan unit or the heater but is drawn into the hairdryer by the action of the fan unit producing the primary flow through the hairdryer. This fluid flow is entrained into the hairdryer by the fluid flowing through the primary fluid flow path 400.

The first end 32 of the body includes a fluid inlet 320 and the second end 34 of the body includes a fluid outlet 340. Both the fluid inlet 320 and the fluid outlet 340 are at least partially defined by the inner duct 310 which is an inner wall of the body 30 and extends within and along the body. A fluid flow path 300 extends within the inner duct 310 from the fluid inlet 320 to the fluid outlet 340. At the first end 32 of the body 30, a side wall 350 extends between the outer wall 360 and the inner duct 310. This side wall 350 at least partially defines the fluid inlet 320. The primary fluid outlet 440 is annular and surrounds the fluid flow path.

A printed circuit board (PCB) 75 including the control electronics for the hairdryer is located in the body 30 near the side wall 350 and fluid inlet 320. The PCB 75 is ring shaped and extends round the inner duct 310 between the inner duct 310 and the outer wall 360. The PCB 75 is in fluid communication with the primary fluid flow path 400. The PCB 75 extends about the fluid flow path 300 and is isolated from the fluid flow path 300 by the inner duct 310.

The PCB 75 controls parameters such as the temperature of the heater 80 and the speed of rotation of the fan unit 70. Internal wiring (not shown) electrically connects the PCB 75 to the heater 80 and the fan unit 70 and the cable 50. Control buttons 62, 64 are provided and connected to the PCB 75 to enable a user to select from a range of temperature settings and flow rates for example.

Downstream of the PCB 75, is the heater 80 and a PCB baffle 700 is provided between the PCB 75 and the heater 80. The PCB baffle provides thermal protection for the PCB 75 when the heater 80 switched on amongst other things.

In use, fluid is drawn into the primary fluid flow path 400 by the action of the fan unit 70, is optionally heated by the heater 80 and exits from the primary fluid outlet 440. This processed flow causes fluid to be entrained into the fluid flow path 300 at the fluid inlet 320. The fluid combines with the processed flow at the second end 34 of the body. In the example shown in FIG. 2, the processed flow exits the primary fluid outlet 440 and the hairdryer as an annular flow which surrounds the entrained flow that exits from the hairdryer via the fluid outlet 340. Thus fluid that is processed by the fan unit and heater is augmented by the entrained flow.

The body 30 is generally symmetrical about a longitudinal axis A-A which extends along the length of the body 30. The duct 310 and outer wall 360 are concentric as is the heater 80 located between the duct 310 and the outer wall 360.

Figure 9:
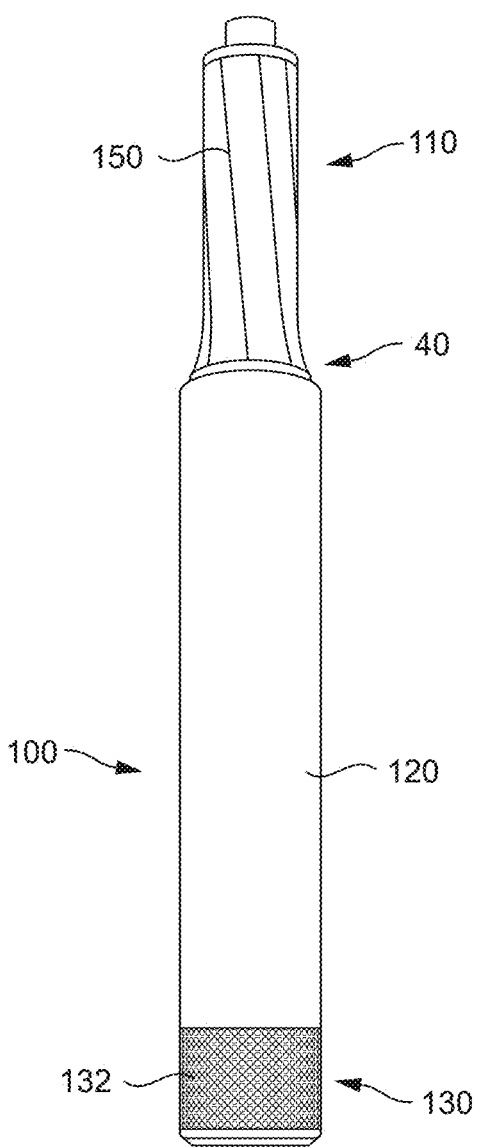
FIG. 9 shows a hot styling appliance having a removable filter.

FIG. 9 shows an example of a hot air styling appliance 100 together with attachment 110. The hot air styling appliance 100 comprises a generally tubular handle 120 having an fluid inlet 130 and a fluid outlet 140 at opposing ends. The tubular handle 120 has an oval cross-section. In this embodiment, components illustrated and already described in relation to FIGS. 1 to 2 have like reference numerals.

The fluid inlet 130 is provided with a filtering system which includes two or three layers of filtration as previously described. The removable portion 52 includes an outer layer formed by a filter grille 132 and the fixed portion 54 includes an inner layer formed by a filter mesh 44 (not shown).

The fluid inlet 130 of the handle comprises an array of apertures 42 which extend around and along the filter grille 132.

Internally (not shown), a fan unit comprises a fan and a motor. In use, the motor drives the fan and air is drawn in through the apertures 42 of the filter grille 132, along an fluid flow path which extends through the length of the handle 120. The fluid is optionally heated by a heater (not shown) before exiting the hot air styling appliance and entering the attachment 110 where fluid exits via slots 150. The appliance 100 may be connected to a power supply via a power cable or could house batteries within the handle 120.

A filter mesh 44 is provided downstream of the filter grille 48, 132. The filter mesh 44 is permanently fixed to the appliance and provides a finer filtering stage; mesh apertures are 80 to 500 microns in diameter with a preferred range of 200-300 microns. Whilst the filter mesh 44 can be cleaned by brushing or wiping, it is advantageous to provide an intermediate filtering layer which retains a proportion of relatively small contaminants upstream of this fine filter so it takes longer to block the filter mesh 44. The filtering system is provided with a third filtering stage and this third filtering stage can form part of the removable portion 52a or the fixed portion 54. The preferred option is that the third filter forms part of the removable portion and so it does not get misplaced in one embodiment, this third filter 148 is co-moulded onto an internal surface 92a of the wall 92 of the filter grille 48. The third filter 148 is a plastic mesh with apertures of 20 to 500 microns and an open area of 40 to 50% with a preferred range of 50 to 100 microns. A suitable material for the third filter is PET (polyethylene terephthalate). Both the filter mesh 44 and the third filter 148 have apertures that are too small to be viewed by eye so individual apertures are not shown. The introduction of the third filter 148 assists in maintaining performance of the appliance.

The removable portion 52 is washable by hand or a dishwasher so anything that is retained by the removable portion can be relatively easily cleaned off and any apertures that are blocked can be cleaned from both the outside and the inside so the effectiveness of the cleaning is high. The fixed portion 54, comprising the inner grille 44 in contrast can only be accessed from the outside surface so any cleaning is less effective.

Referring now to FIGS. 4a to 6c, the filter grille 48 is a removable article. The handle 20 and the filter grille 48, 132 are cylindrical or tubular having a circular 48 or oval 132 cross-section. The filter grille 48, 132 has two states and is flexible; moulded from a plastic material and in a first state, it is open in a natural, relaxed state. It has a wall 92 which is curved forming an open loop or C-shape and having end faces 190, 192 extending axially along the wall 92 which are separated by a gap 94 or break in the wall. In the second state, the filter grille 48, 132 is closed (FIG. 4a), the wall 92 forms a closed loop; the gap 94 is closed. In this embodiment, the filter grille 48, 132 is retained in the closed state by use of mechanical and magnetic couplings. The mechanical and magnetic couplings can be broken and reformed by hand.

In order to retain the filter grille 48, 132 in a closed configuration a magnetic coupling 170 is used. Either a pair of magnets or one magnet and one piece of magnetisable material are located on either side of the gap 94. In this example the magnetic coupling 170 is housed at one end 92b of the wall 92 of the filter grille 48, 132 in appropriately sized recesses 172. In addition, a mechanical joint 60 (FIG. 6c) extends longitudinally along the filter grille 48, 132 which assists in maintaining the circularity of the filter grille 48, 132 in the closed state. One end face 190 is provided with a protrusion 194 and the other end face 192 is provided with a correspondingly sized recess 196 (FIG. 6a) forming a mortise and tenon joint. Thus, when the magnetic coupling 170 is brought together, the protrusion 194 engages the recess 196 forming the mechanical joint 60 and gap 94 is closed.

For the embodiment described with respect to FIGS. 3 to 8, the removable portion 52 48 is retained with respect to the fixed portion 54 of the filtering system 20 by mechanical and magnetic couplings. The fixed portion 54 includes the filter mesh 44 (FIGS. 3, 4c and 8) and a frame 56 which supports the filter mesh 44 and provides a mechanical coupling for the removable portion 52. The frame 56 has a first edge 152 and a second edge 154 which extend around the circumference of the filter mesh 44, the first edge 152 being located adjacent the distal end 200a of the outer wall and the second edge 154 being located adjacent the first end 24 of the handle. A connecting portion 156 extends longitudinally between the first edge 152 and the second edge 154.

The connecting portion 156 provides a location for the mechanical coupling. The filter grille 48, 132 is relatively thin $t_1$ so where the mechanical joint 60 formed from the protrusion 194 and the recess 196 is provided, the thickness $t_2$ of the wall, 92 is increased to accommodate the mechanical joint 60. This local thickening also provides the space for the recesses 172 which house the magnetic coupling 170.

In addition to retaining the circularity of the filter grille 48, 132 the mechanical joint 60 provides a means for the filter grille 48, 132 to be retained mechanically with respect to the fixed portion 54 of the filtering system. The mechanical joint 60 provides a rectangular extension within the filter grille 48, 132; the mechanical joint 60 extends radially inwards from an inner surface 92a of the wall 92. The connecting portion 156 includes a slot 158 which is adapted to retain the mechanical joint 60 when the filter grille 48, 132 is attached to the handle 20.

Figure 4C:
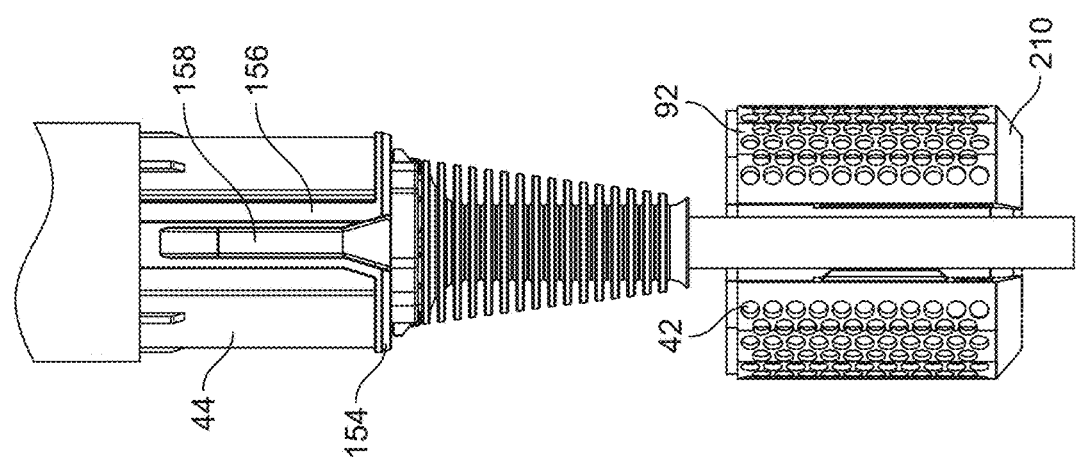
FIGS. 4a, 4b and 4c show the inlet of a hairdryer with the filter grille in various stages of removal.
Figure 4B:
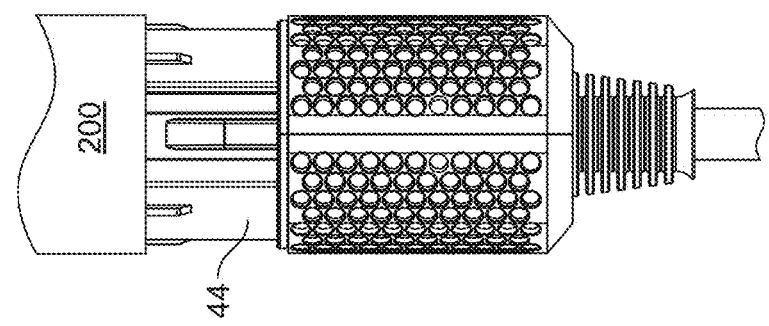
Figure 4A:
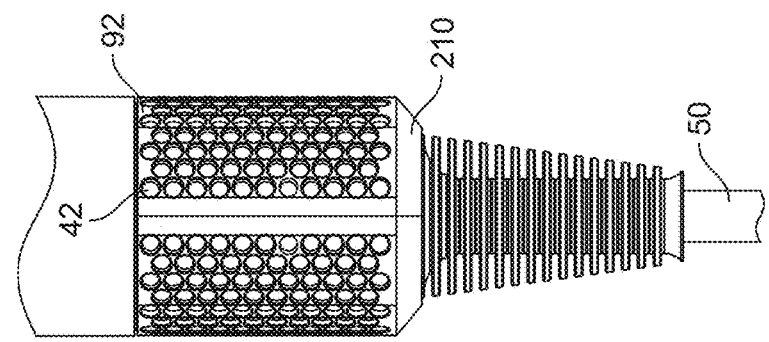
Figure 5B:
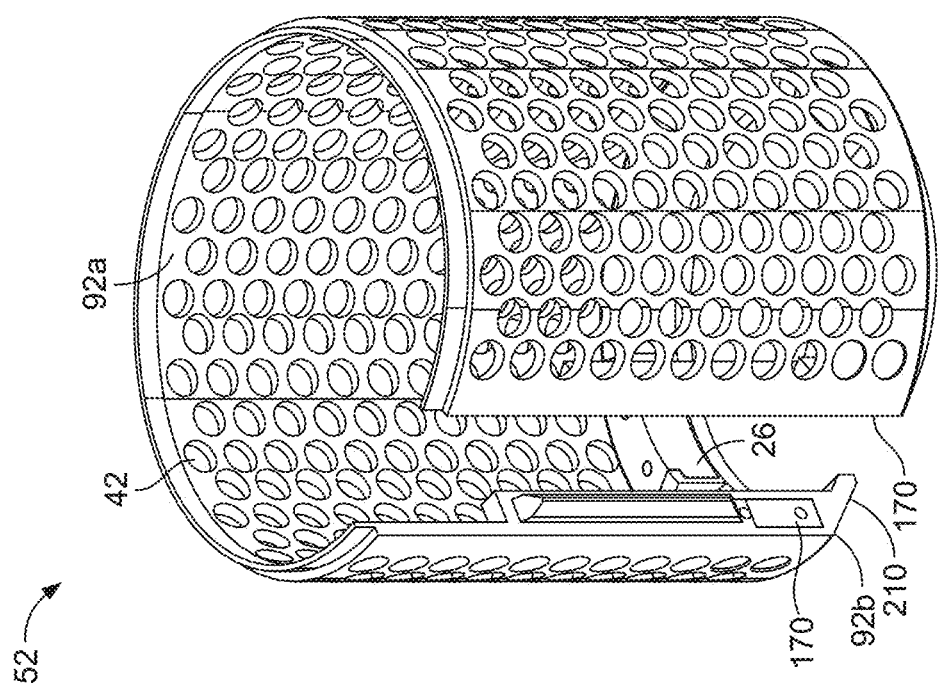
FIGS. 5a and 5b, show isometric views of two filter grille embodiments according to the invention.
Figure 5A:
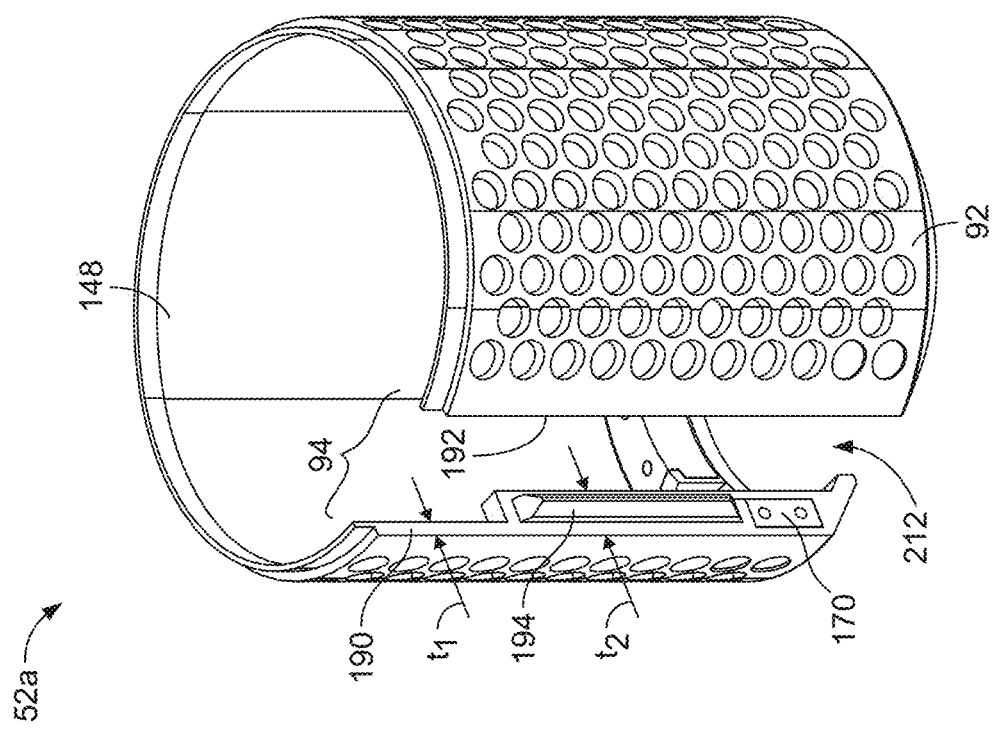
Figure 6A:
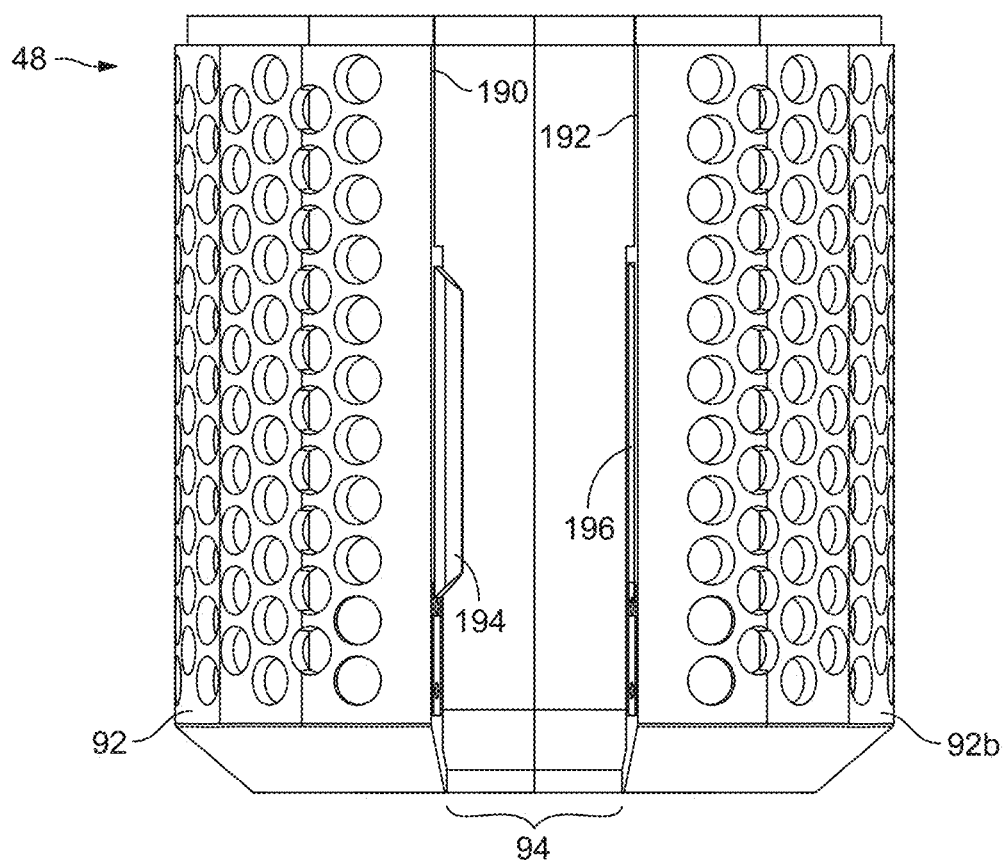
FIG. 6a shows a side view of a filter grille in the open state.
Figure 6B:
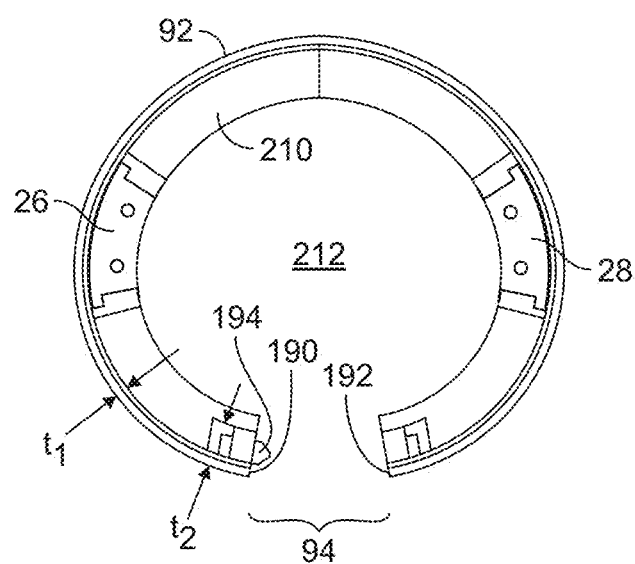
FIG. 6b shows a top view of a filter grille in the open state.
Figure 6C:
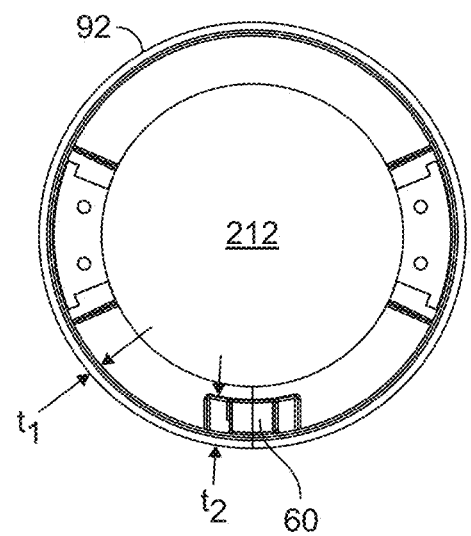
FIG. 6c shows a top view of the filter grille in the closed state.
Figure 7:
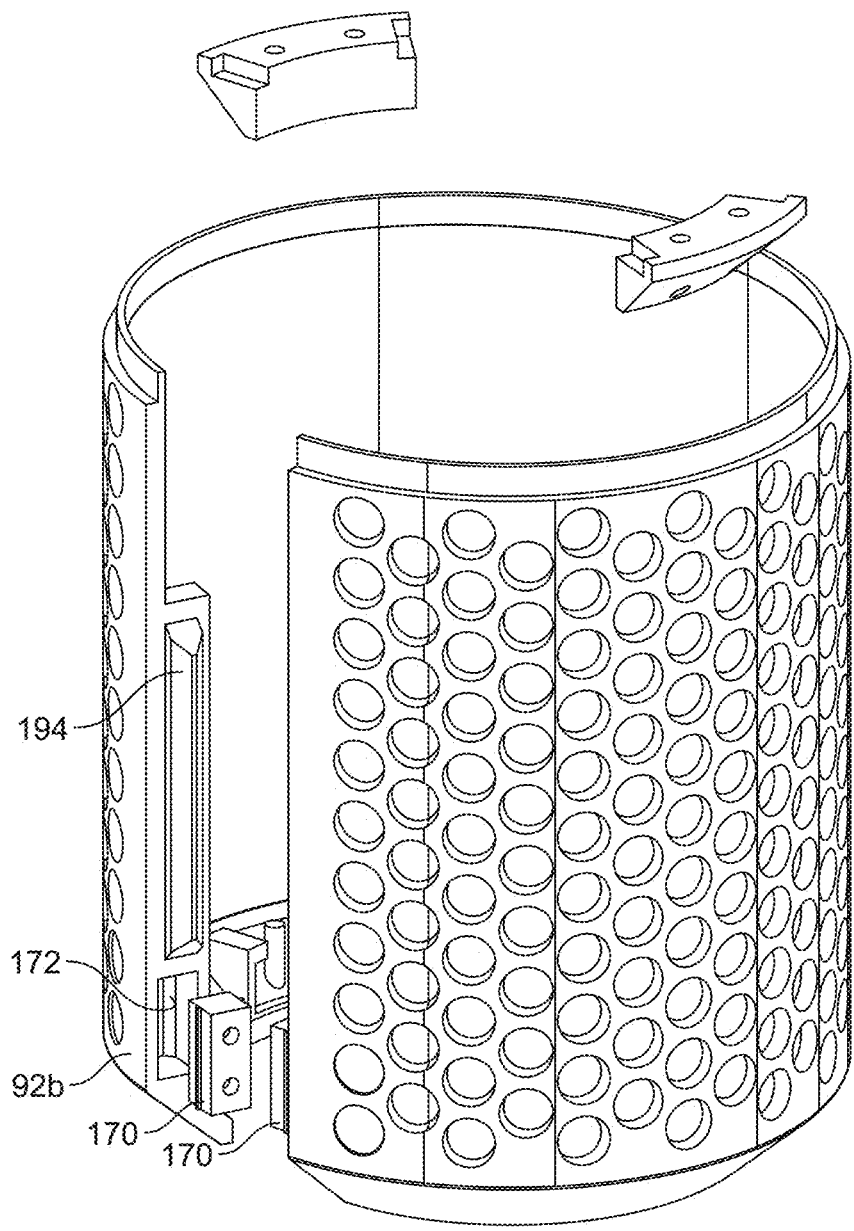
FIG. 7 shows an exploded isometric view of a filter grille.
Figure 8:
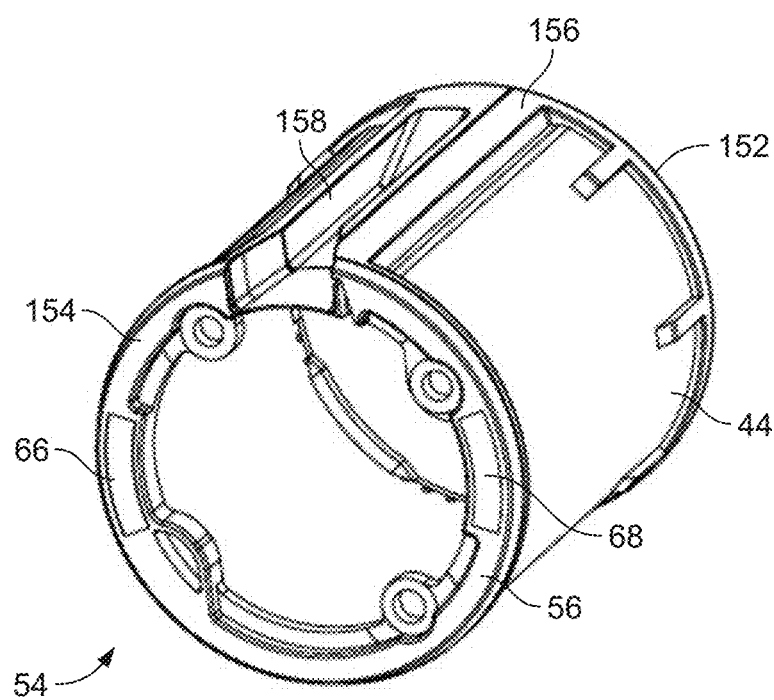
FIG. 8 shows a filter mesh according to the invention.

Referring now to FIGS. 4a to 4c, the filter grille 48 is initially attached to the appliance and collects hair and contaminants from the surrounding air when the appliance is turned on. Over time, some blocking of the apertures 42 of the filter grille 48 and optional third layer 148 will occur which could affect the overall performance of the appliance. The appliance may include an indicator which informs a user that the performance of the appliance has reduced and the filtering system should be checked for blockage.

The removable portion 52 of the filtering system is removed from the fixed portion 54 by sliding the removable portion 52 longitudinally away from the outer wall 200 of the handle 20. Once the mechanical joint 60 has disengaged from the slot 158, the removable portion 52 (comprising the filter grille 48 and optionally the third layer 148) can be removed from the cable. The magnetic coupling 170 is broken which places the filter grille 48 into its first state, i.e. open, with a gap 94 formed between opposite end faces 190, 192 of the wall 92. The gap 94 together with the flexible nature of the removable portion 52 enables the filter grille 48 and optionally the third layer 148 to be subsequently disengaged from the cable 50 for washing either by hand or using a dishwasher.

In addition to having a mechanical coupling between the removable portion 52 and the fixed portion 54, in the embodiment described in FIGS. 3 to 8, there is a magnetic attachment. The filter grille 32 is provided with a pair of magnets 26, 28 which are housed in the end wall 210 and the frame 56 of the fixed portion 54 is also provided with a pair of magnets 66, 68. Both pairs of magnets 26, 28 and 66, 68 are radially spaced from the mechanical joint 60 and ideally are located diametrically opposite each other to give an even force either side of the mechanical joint 60.

The skilled person will understand that one of the pair of magnets 26, 28 and 66, 68 may be replaced with a magnetisable material.

The connecting portion 156 of the frame 56 is wider or extends across a greater proportion of the circumference of the fixed portion 54 than the mechanical joint 60. This is to ensure that any stray fluid that could be pulled in through the mechanical joint 60 is filtered by the filter mesh 44.

The invention has been described in detail with respect to a hairdryer however, it is applicable to any appliance that draws in a fluid and directs the outflow of that fluid from the appliance.

The fluid that flows through the appliance is generally air, but may be a different combination of gases or gas and can include additives to improve performance of the appliance or the impact the appliance has on an object the output is directed at for example, hair and the styling of that hair.

The invention is not limited to the detailed description given above. Variations will be apparent to the person skilled in the art

The invention claimed is:

1. A hair care appliance comprising:
a cylindrical housing having a first end and a second end and a fluid inlet which is cylindrical and is adjacent the first end of the housing,
a fluid outlet,
a fluid flow path extending between the fluid inlet and the fluid outlet, and
a cable for supplying power to the appliance, wherein the cable connects to the housing at the first end of the housing, wherein the fluid inlet is provided with a filtering system comprising a removable portion, wherein the removable portion comprises a filter grille having first and second states, and the filter grille is retained in the first state by a magnetic coupling between two portions of the filter grille, wherein when removing the removable portion, the filter grille in the first state extends around the cable and in the second state can be disengaged from the cable, and wherein the filtering system further comprises a fixed portion including a filter mesh, and the filter mesh is retained with respect to the cylindrical housing when the filter grille is removed.

2. The appliance of claim 1, wherein the cylindrical housing extends along an axis between the first end and the second end.

3. The appliance of claim 1, wherein the filter grille is retained with respect to the cylindrical housing via one or more of a twist lock system and a magnetic coupling.

4. The appliance of claim 1, wherein the cylindrical housing comprises an outer wall extending from the second end towards the first end and, when attached to the cylindrical housing, the filter grille comprises a wall which extends from the first end of the cylindrical housing towards the second end.

5. The appliance of claim 4, wherein the wall of the filter grille abuts the outer wall.

6. The appliance of claim 4, wherein the wall of the filter grille comprises a lip which extends either inside or outside the outer wall.

7. The appliance of claim 1, wherein the filtering system comprises a third filtering layer.

8. The appliance of claim 7, wherein the third filtering layer is a mesh and is secured to an inner surface of the filter grille.

9. The appliance of claim 1, wherein the filter grille is washable.

10. The appliance of claim 1, wherein the magnetic coupling comprises either of two magnets or a magnet and a piece of magnetisable material.

11. The appliance of claim 1, wherein the two portions of the filter grille comprise a first edge and a second edge.

12. The appliance of claim 11, wherein the filter grille comprises a wall and the wall extends between the first edge and the second edge.

13. The appliance of claim 11, wherein, when the filter grille is in the first state, the first edge and the second edge abut.

14. The appliance of claim 11, wherein the first edge and the second edge are each provided with a recess for accommodating either a magnet or magnetisable material.

15. The appliance of claim 4, wherein when the filter grille is attached to the housing, the magnetic coupling is adjacent the first end of the housing.

16. The appliance of claim 11, wherein the first edge and the second edge each comprise a part of a locating feature.

17. The appliance of claim 16, wherein the locating feature is formed from a protrusion extending circumferentially from one of the first edge and the second edge and a cooperating recess in the other one of the first edge and second edge.

18. The appliance of claim 1, wherein the filter mesh comprises a frame and filtering media bonded to the frame.

19. The appliance of claim 18, wherein the frame comprises a locating slot extending along the frame parallel to an axis extending between the first end and the second end of the housing.

20. The appliance of claim 19, wherein the filter grille comprises a mechanical joint extending radially inwards from an inner surface of a wall of the filter grille and the mechanical joint is adapted to be retained within the locating slot.

21. The appliance of claim 20, wherein the mechanical joint is formed from two parts, a first part of the mechanical joint is formed adjacent the first edge of the wall and a second part of the mechanical joint is formed adjacent the second edge of the wall.

22. The appliance of claim 12, wherein, when the filter grille is in the second state, the first edge and the second edge of the wall are spaced apart.

23. The appliance of claim 1, wherein the appliance is a hairdryer.

24. The appliance of claim 1, wherein the appliance is a hot styling brush.

25. A hair care appliance comprising:
a cylindrical housing having a first end and a second end and a fluid inlet which is cylindrical and is adjacent the first end of the housing,
a fluid outlet,
a fluid flow path extending between the fluid inlet and the fluid outlet, and
a cable for supplying power to the appliance, wherein the cable connects to the housing at the first end of the housing, wherein the fluid inlet is provided with a filtering system comprising a removable portion, wherein the removable portion comprises a filter grille having first and second states, and the filter grille is retained in the first state by a magnetic coupling between two portions of the filter grille, wherein when removing the removable portion, the filter grille in the first state extends around the cable and in the second state can be disengaged from the cable, wherein the two portions of the filter grille comprise a first edge and a second edge, and wherein the first edge and the second edge are each provided with a recess for accommodating either a magnet or magnetisable material.

\* \* \* \* \*